June 5, 1934.  B. R. RODRIGUEZ  1,961,305
AUTOMOBILE LOCKING DEVICE
Filed Jan. 22, 1934   2 Sheets-Sheet 1

Inventor
BENJAMIN R. RODRIGUEZ

By Clarence A. O'Brien
Attorney

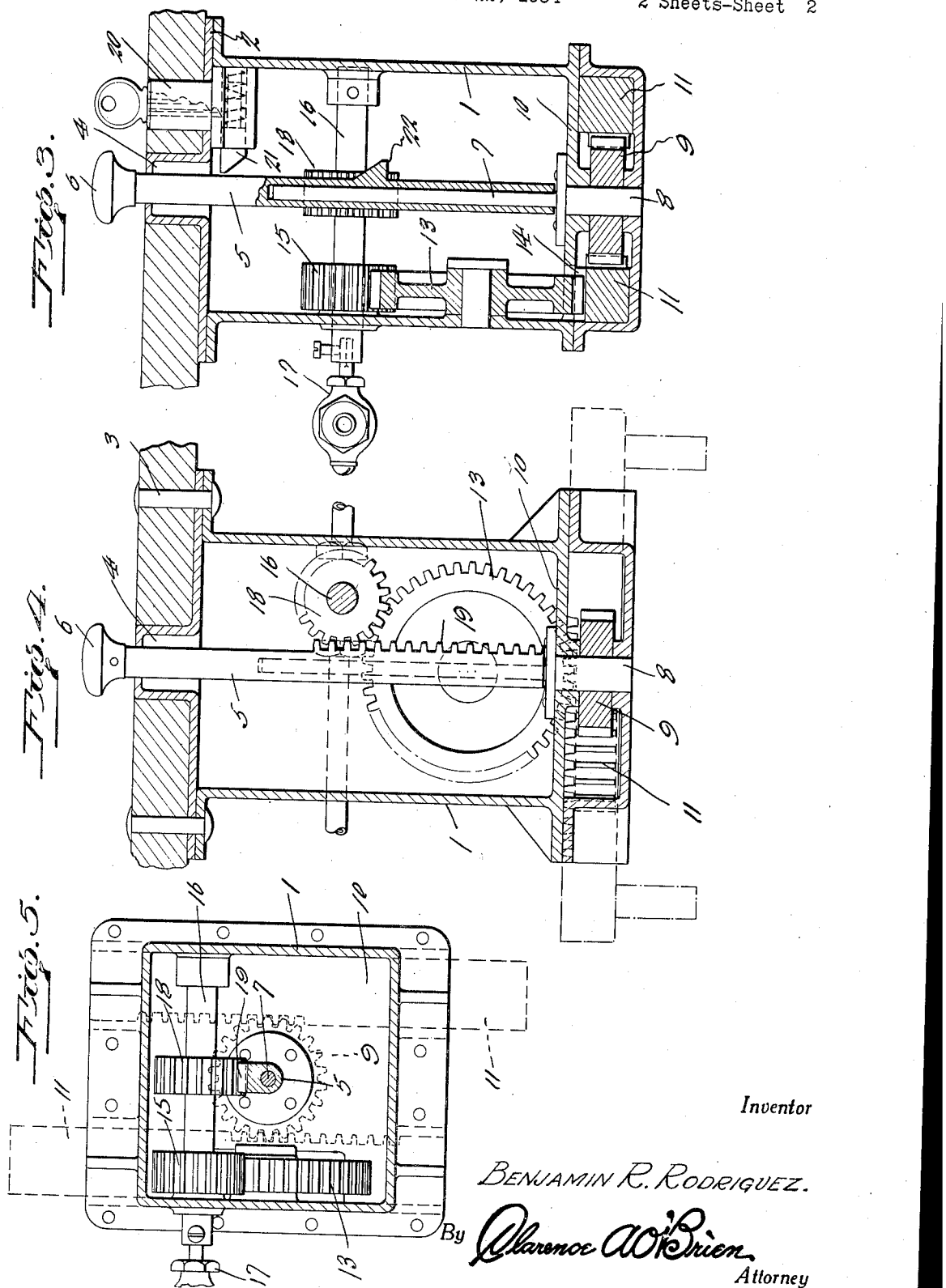

Patented June 5, 1934

1,961,305

UNITED STATES PATENT OFFICE 1,961,305

AUTOMOBILE LOCKING DEVICE

Benjamin Rivera Rodriguez, Newark, N. J.

Application January 22, 1934, Serial No. 707,795

1 Claim. (Cl. 70—126)

This invention relates to a locking device for automobiles and the like, the general object of the invention being to provide means for locking the brake and clutch pedals in lowered position and for closing the gas line, thereby preventing unauthorized use of the vehicle.

This invention also consists in certain other features of construction, and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Fig. 3 is an enlarged vertical sectional view through the device.

Fig. 4 is a similar view but taken at right angles to Fig. 3.

Fig. 5 is a horizontal sectional view.

Figure 1:
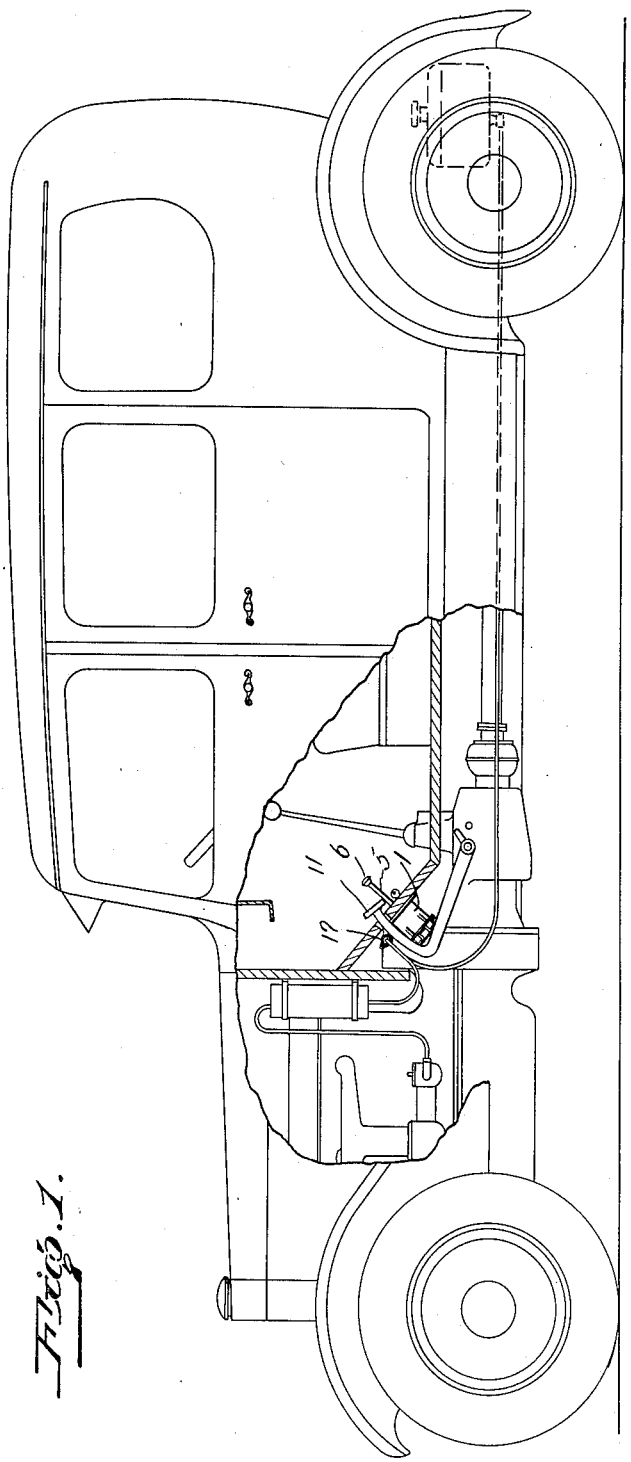
Figure 1 is an elevation of an automobile with parts broken away to show the application of the invention.
Figure 2:
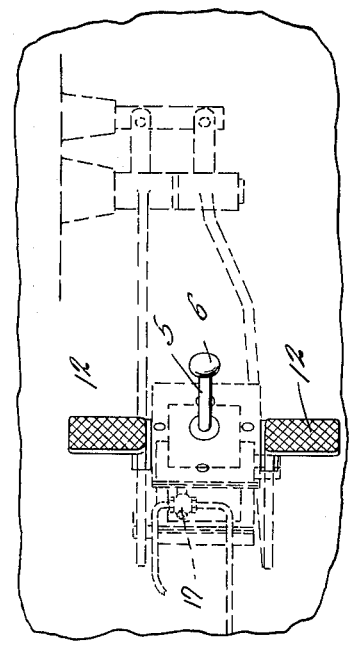
Fig. 2 is a fragmentary top plan view showing the device as located adjacent the pedals.

In these drawings, the numeral 1 indicates a casing which has a cover part 2 contacting the under face of one of the floor boards of the automobile, the casing and its cover being fastened to the floor board by the rivets 3 so that it is impossible for any one to gain access to the casing without a great deal of difficulty.

The cover 2 is formed with a tubular part 4 which extends upwardly through a hole in the floor board and this part has a hole therein, slidingly receiving a shank 5 having a head 6 at its upper end. The lower part of the shank is hollow to receive the vertical guiding rod 7 which is attached to the bottom of the casing and which is formed with a bearing part 8 for a gear 9 which is located between the bottom of the casing and a partition 10.

A pair of rack members 11 is located in the lower part of the casing and said members are adapted to extend through holes in opposite sides thereof and above the clutch and brake pedals 12 of the automobile to prevent these pedals from rising after they have been depressed and the rack bars are projected. A gear 13 is journalled in the casing and has its teeth engaging a second toothed part 14 on one of the bars 11, the first toothed part of which being engaged by the gear 9 and this gear 13 is engaged by a pinion 15 on a shaft 16 which is journalled in the casing and has one end projecting therefrom and this end is connected to the stem of a valve 17 located in the fuel line.

A second gear 18 is located on the shaft 16 and is engaged by the rack teeth 19 on the shank 5.

Thus when the shank is pulled upwardly, it will rotate the shaft 16 through means of the teeth engaging the gear 18 and the rotation of this shaft 16 will close the valve 17, thus shutting off fuel to the engine, and the rotation of this shaft 16 will be communicated to the racks 11 through means of the gears 16, 13, and 9 so that the racks 11 will be projected in opposite directions and thus pass above the two depressed pedals 12 to prevent the pedals from rising.

Thus the fuel line is closed so that no fuel can pass to the motor, and both pedals are held in lowered position, so that the brakes are held applied and the clutch released, and thus it is impossible for an unauthorized person to operate or drive off the vehicle.

A key operated lock 20 has its barrel part passing through the floor board and this barrel part operates a latch 21 for engaging a keeper member 22 on the shank 5 so as to hold the same in raised position with the locking parts in locking position.

Thus it will be necessary for one to open the lock by the proper key before he can move the shank downwardly to open the valve and withdraw the rack 11.

It is thought from the foregoing description that the advantages and novel features of the invention will be readily apparent.

It is to be understood that changes may be made in the construction and in the combination and arrangement of the several parts provided that such changes fall within the scope of the appended claim.

Having thus described my invention, what I claim as new is:—

In combination with a motor vehicle including clutch and brake pedals, and a valve in the fuel line, a pair of rack bars for passing over the pedals after the same have been depressed, a gear engaging the rack bars for moving them in opposite directions, a shaft connected with the valve, gearing connecting the shaft with one of the rack bars, a plunger having rack teeth thereon, a pinion on the shaft engaged by the teeth of the plunger, and a key operated lock for holding the plunger in a position with the rack bars projected and the valve closed.

BENJAMIN RIVERA RODRIGUEZ.